United States Patent [19]
Wanja

[11] Patent Number: 5,258,737
[45] Date of Patent: Nov. 2, 1993

[54] POTENTIOMETER

[75] Inventor: Roland Wanja, Hemmingen, Fed. Rep. of Germany

[73] Assignee: Robert Bosch GmbH, Stuttgart, Fed. Rep. of Germany

[21] Appl. No.: 947,598

[22] Filed: Sep. 21, 1992

[30] Foreign Application Priority Data

Sep. 21, 1991 [DE] Fed. Rep. of Germany ....... 4131536

[51] Int. Cl.$^5$ .............................................. H01C 10/10
[52] U.S. Cl. ...................................................... 338/75
[58] Field of Search ................................... 338/75, 189

[56] References Cited

U.S. PATENT DOCUMENTS

| | | |
|---|---|---|
| 2,085,404 | 6/1937 | Vollenbroek .......................... 338/75 |
| 2,357,433 | 9/1944 | Side ........................................ 338/75 |
| 3,854,113 | 12/1974 | Fletcher et al. ....................... 338/75 |
| 4,642,602 | 2/1987 | Maisch et al. . |
| 4,694,272 | 9/1987 | Maisch . |

Primary Examiner—Marvin M. Lateef
Attorney, Agent, or Firm—Edwin E. Greigg; Ronald E. Greigg

[57] ABSTRACT

A potentiometer, which avoids problems caused when abraded material collects on the surface of the potentiometer track as a result of friction between the wiper contact and the potentiometer track, causing an undesirable increase in the contact resistance. Potentiometer track and wiper contact wear is also speeded up by this abrasion, which shortens the service life of the potentiometer. The novel potentiometer has a magnet, on a movable extension arm, that removes the abraded material from the surface of the potentiometer track in a contactless manner, thus preventing increased deposition of abraded material on the potentiometer track that would otherwise occur with increased time in operation. The novel potentiometer is especially suitable for air flow rate meters of mixture-compressing, externally ignited or air-compressing, self-igniting engines.

2 Claims, 1 Drawing Sheet

POTENTIOMETER

BACKGROUND OF THE INVENTION

The invention is based on a potentiometer as defined hereinafter. A potentiometer is already known in which to convert a mechanical input variable, such as a rotational angle, into a corresponding electrical output signal, such as an electric voltage, a wiper contact slide on a potentiometer track; the magnitude of the output signal depends on the input variable and thus on the position of the wiper contact on the potentiometer track.

A prerequisite for an electrically properly conducting connection between the wiper contact and the surface of the potentiometer track, and thus for proper potentiometer function, is that the wiper contact should rest flush on the surface of the potentiometer track. This is achieved for instance by disposing the wiper contact on a wiper lever in the form of a spring, which presses the wiper contact continuously against the surface of the potentiometer track with a slight pressure.

As the pressing force increases, the friction-caused wear to the surfaces of the wiper contact and potentiometer track increases as well. This wear takes the form of abraded material, for the most part material removed from the potentiometer track and the wiper contact. As the length of time in operation increases, this abraded material collects in loose, finely dispersed form on the wiper contact and potentiometer track surfaces, where it leads to increased contact resistance, which by definition has a negative impact on the output signal generated by the potentiometer.

Moreover, the abraded material dispersed finely over the surface of the potentiometer track acts as an abrasive medium, which leads to premature wear of the potentiometer track and wiper contact because of removal of material and thus shortens the potentiometer service life.

OBJECT AND SUMMARY OF THE INVENTION

The potentiometer according to the invention has an advantage over the prior art that the magnetically conductive abraded material produced by the motion of the wiper contact on the surface of the potentiometer track is removed in contactless fashion, so that the wiper contact always slides over a potentiometer track that is free of abraded material, and the contact resistance and thus the output signal do not vary as the time in operation increases.

Another advantage of the invention is that the potentiometer track and wiper contact wear is greatly reduced because there is less friction between the potentiometer track and the wiper contact because of the abrasion-free surface of the potentiometer track; this considerably prolongs the service life of the potentiometer.

Coupling of the motion of the magnet and wiper contact has the advantage that the potentiometer track is freed of abraded material upon each motion of the wiper contact, in the region swept by the magnet.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
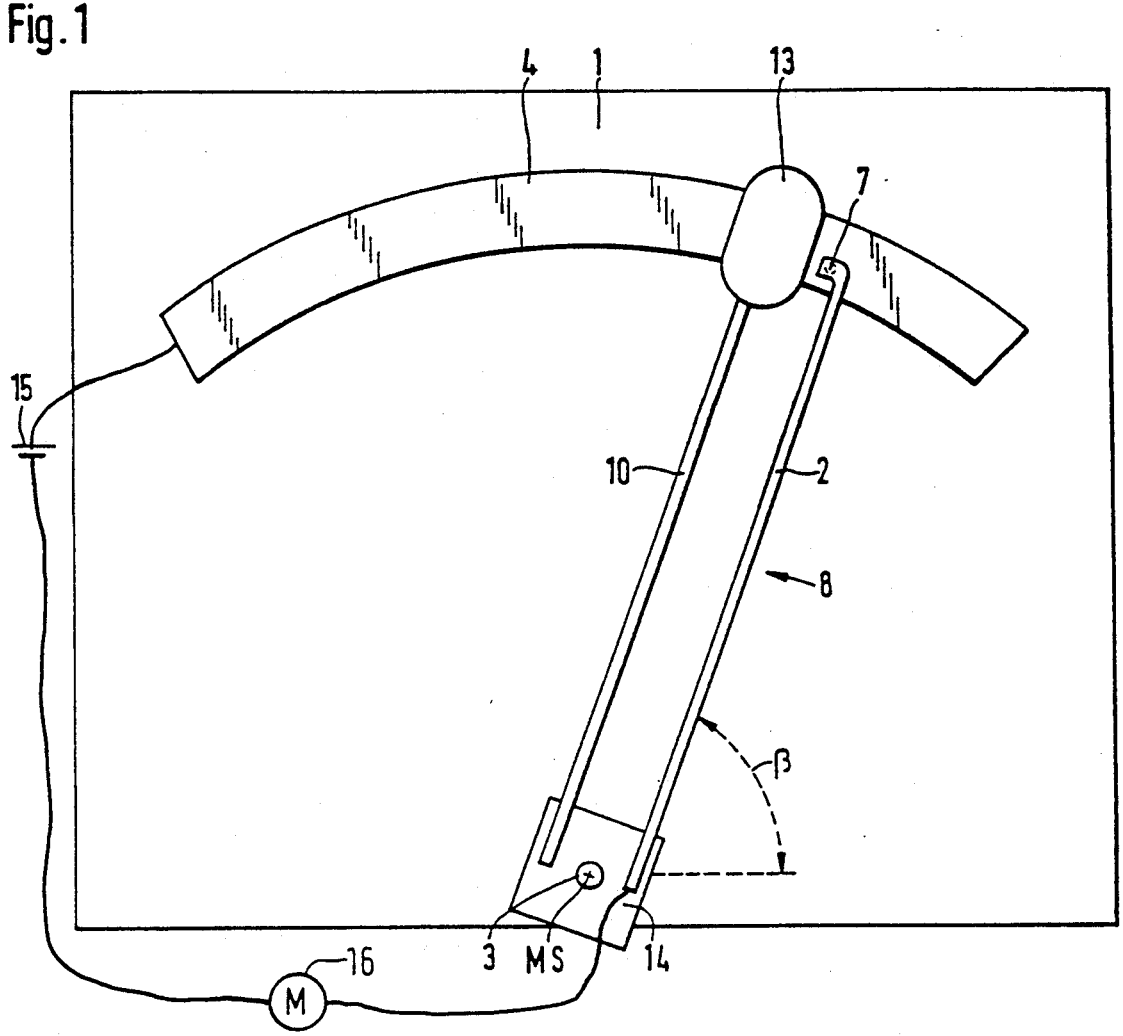
FIG. 1 is a plan view on a potentiometer embodied according to the invention.

FIG. 1 shows an electric potentiometer, which converts a mechanical input variable, such as an angle of a rotary motion, into an electrical output signal, such as an electrical voltage, and which has an electrically nonconductive substrate 1, for instance made of ceramic material and a wiper lever 2 made of electrically conductive material, such as a copper alloy. The wiper lever 2 is rotatably supported by a center point MS about a pivot shaft 3; with the end remote from the center point MS, in a rotary motion in the direction of the angle $\beta$, which is the input variable, the lever 2 sweeps over a potentiometer track 4 of electrically conductive material that is applied to the substrate 1 in the form of an arc-shaped segment around the center point MS. The end of the wiper lever 2 remote from the center point MS, in the region that sweeps over the potentiometer track 4, is provided with a wiper contact 7, which touches the surface of the potentiometer track 4 and thus makes an electrically conductive connection between the potentiometer track 4 and the wiper lever 2. Together, the potentiometer track 4 and the wiper contact 7 form a voltage pickup 8. An electrical voltage of a direct voltage source 15 is located between one end of the potentiometer track 4, which as an ohmic resistor and the lower end of the lever 2; a linear relationship, for instance, exists between the potential of a point on the surface of the potentiometer track 4 located between the ends of the potentiometer track 4 and its distance from one of the two ends. Depending on the magnitude of the resistance and on the electrical voltage applied to the potentiometer track 4, an electrical current flows through the potentiometer track 4. A meter 16 connected between the potential 15 and the end of lever 2 indicates the movement of the arm in degrees.

The voltage pickup 8, which likewise acts as an ohmic resistor, is connected by an end toward the center point MS to the potential level that represents the lower of the two electrical potentials applied to the potentiometer track. The wiper contact 7, disposed at one end of the voltage pickup 8 and sliding on the surface of the potentiometer track 4, is connected to a potential that is between the potentials applied to the potentiometer track 4 and that corresponds to the position of the wiper contacts 7 on the potentiometer track 4 in accordance with the aforementioned relationship, which for instance is linear. The intensity of the current flowing through the voltage pickup 8 depends in a known manner on the electrical voltage applied to the voltage pickup 8, which corresponds to the difference in the potentials at the two ends of the voltage pickup 8, and on the magnitude of the ohmic resistance. A motion of the voltage pickup 8 in the direction of the angle $\beta$ varies the voltage applied to the voltage pickup 8 and consequently varies the intensity of the current flowing through it.

Figure 2:
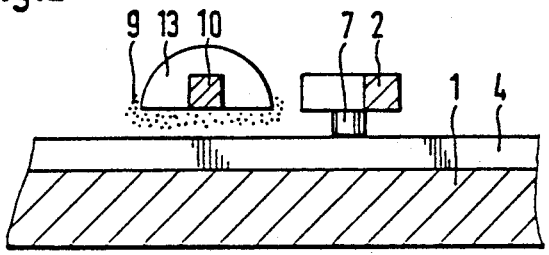
FIG. 2 is an enlarged detail of the potentiometer, with a magnet disposed according to the invention.

The wiper lever 2 is embodied as a springlike arm, which constantly presses the wiper contact 7 against the surface of the potentiometer track 4 with a slight force, so that a properly conductive electrical connection is made. Friction, which arises upon a motion of the wiper contact 7 over the surface of the potentiometer track 4, causes wear to the two surfaces sliding on one another; in the form of abraded material 9, this wear is deposited on the potentiometer track 4 and the wiper contact 7, as FIG. 2 of the drawing shows. Unless it is removed, the abraded material 9 as it increases in thickness causes an increase in the contact resistance and consequently a change in the output signal, so that as the time in operation increases, the characteristic curve of the potentiometer shifts.

To prevent soiling of the potentiometer track 4 from abraded material 9, the potentiometer of the invention has a magnet 13, disposed on a movable extension arm 10 and aimed at the potentiometer track 4; it removes the magnetically conductive abraded material 9 from the surface of the potentiometer track 4 without contacting it. To that end, the magnet 13 is disposed on the end of the extension arm 10 remote from the center point MS and, as FIG. 2 more clearly shows, with a small clearance above the surface of the potentiometer track 4, and with its length it covers the entire width of the potentiometer track 4. The extension arm 10 is for instance aligned parallel to the wiper lever 2 and, like the lever 2, is rotatably supported around the center point MS, so that the magnet 13 is located near the wiper contact 7 and depending on the direction of the rotary motion sweeps over the face of the potentiometer track 4 in front of or behind the wiper contact 7. Both the wiper lever 2 and the extension arm 10 may for instance be secured to the same bracket 14, which is rotatable about the center point MS, so that the direction of motion is the same for both the magnet 13 and the wiper contact 7.

The abraded material 9 collecting on the surface of the potentiometer track 4 and made up of magnetically conductive material is attracted by the magnet 13 and lifted from the surface of the potentiometer track 4, so the wiper contact 7 slides on an abrasion-free surface. The abraded material 9 is preferentially deposited at the two poles of the magnet 13, because the magnetic force is strongest in those regions. By suitable aiming of the poles, various distributions of the abraded material 9 over the magnet 13 can be attained.

By disposing the magnet 13 directly above the surface of the potentiometer track 4, the potentiometer is made largely maintenance-free, which is especially advantageous for potentiometers installed in encapsulated housings, as is typical for instance for arrangements for air flow rate metering for fuel injection systems in mixture-compressing engines with externally supplied ignition or in air-compressing self-igniting engines.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A potentiometer for generating an electrical output signal corresponding to a mechanical input variable, having a wiper contact and a potentiometer-resistance track on whose surface the wiper contact slides, wherein the output signal assumes a value corresponding to the location of the wiper contact on the potentiometer track, a magnet (13) is disposed movably above and a short distance away from the potentiometer track (4).

2. A potentiometer as defined by claim 1, in which the motion of the magnet (13) is coupled to the motion of the wiper contact (7).

* * * * *